J. F. CRAVEN.
SHREDDER FOR PARAFFIN WAX AND THE LIKE.
APPLICATION FILED JAN. 31, 1911.
1,036,966.
Patented Aug. 27, 1912.
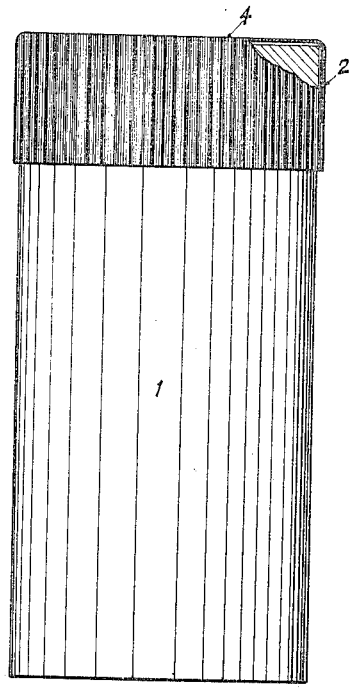
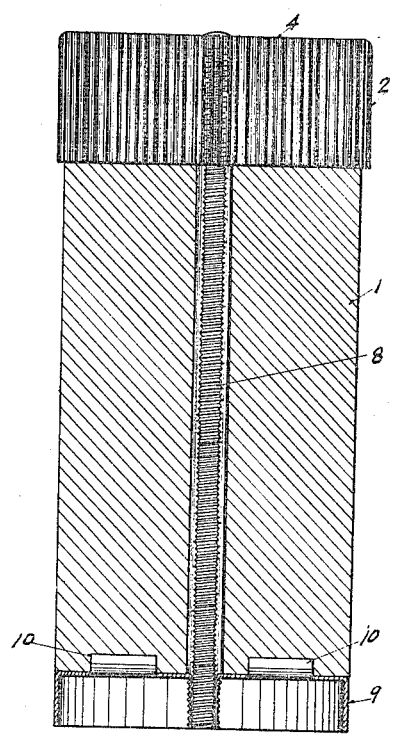
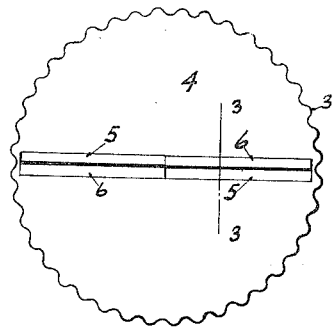
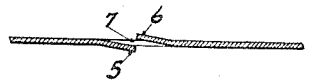
WITNESSES
INVENTOR

UNITED STATES PATENT OFFICE.

JAMES F. CRAVEN, OF PITTSBURGH, PENNSYLVANIA, ASSIGNOR TO CRAVEN ENGINEERING COMPANY, OF PITTSBURGH, PENNSYLVANIA, A CORPORATION OF PENNSYLVANIA.

SHREDDER FOR PARAFFIN-WAX AND THE LIKE.

1,036,966.  Specification of Letters Patent.  Patented Aug. 27, 1912.

Application filed January 31, 1911. Serial No. 605,839.

*To all whom it may concern:*

Be it known that I, JAMES F. CRAVEN, a resident of Pittsburgh, in the county of Allegheny and State of Pennsylvania, have invented a new and useful Improvement in Shredders for Paraffin-Wax and the Like, of which the following is a specification.

This invention relates to a device for shaving or granulating solid material, such as paraffin, soap, chocolate and other substance.

The purpose of the invention is to provide a device whereby wax or other similar substance can be readily shaved or comminuted into uniform shavings or pieces, and which device is so simple and cheap of production that it can be supplied, with each cylindrical cake of wax or similar substance and may be discarded when that cake is used up, thus obviating the necessity of an expensive and complicated device which must be cleaned, and sharpened, or if not cleaned becomes unsightly and unsanitary.

The invention comprises a device having the structural features hereinafter described and claimed.

In the accompanying drawing Figure 1 is a side view partly in section, of the simplest form of my device showing the same applied to a cylinder of paraffin or the like; Fig. 2 is a plan view of the same; Fig. 3 is a section on the line 3—3, Fig. 2; and Fig. 4 is a side view, partly in section, of a modification.

In the drawings 1 indicates the cake of paraffin, soap or other substance to be reduced to shavings, and which for the purpose of my invention is cylindrical. The shaver comprises a cylindrical cup 2 of such diameter as to fit loosely over the cake 1 and having an annular flange of such length as to have a substantial bearing on the cake and be guided thereby. The periphery of the cup is roughened, such as by fluting or corrugating the same, as shown at 3, in order that it may be firmly grasped to rotate the same. The end or head 4 of the cup is provided with one or more cutters, preferably arranged radially as shown in Fig. 2, and adapted when the cup is rotated on the cake to shave thin slices or shavings therefrom. These cutters can be most easily and cheaply formed by making the cup of thin sheet metal and slitting the head radially and bending one edge inwardly as shown at 5, and the other slightly outwardly, as at 6, Fig. 3, to form the cutter and leave a slit 7 through which the shaving passes.

The entire cup can be struck up from thin sheet metal by a simple die operation, and at a total cost of a few cents. Hence it can be supplied without extra cost with each cake of paraffin, soap or the like. It is used by merely placing it over the end of the cake and rotating the same on the cake, or rotating the cake in the cup, while pressing the same endwise together, thereby cutting the substance off the end of the cake in thin shavings.

Fig. 4 shows the addition of means for automatically pressing the cup and cake together endwise. It comprises a threaded rod 8 secured centrally to the cup 2 and engaging a threaded hole in a piston or follower 9 arranged to bear against the end of the cake 1, and provided with means, such as radial ribs or flanges 10, to prevent relative rotation of the follower and the cake. Obviously when the cup 2 is rotated the follower 9 is caused to travel toward the cup in the manner of a nut, and presses the cake against the cup. The pitch of the thread on the rod 8 determines the thickness of the shavings cut from the cake.

The device described is intended principally for shaving paraffin or like wax for laundry, floor and other purposes. Such waxes are now generally put up in thin rectangular or like cakes and are shaved by hand with an ordinary knife. Not only is this slow and tedious, but the shavings are very non-uniform in thickness, and when in haste are likely to be entirely too thick for the intended purpose. With my device the shavings can be cut as thin as desired, depending on the width of the slit 7, and can easily be as thin as tissue paper,—or mere flakes. Thus the wax much more effectively serves its purpose, whether for laundry purposes or for waxing floors. The only change necessary is that the wax be molded in cylindrical instead of thin cakes of rectangular form, which will not add to its cost. The shaving device can be so cheaply produced that it can be furnished with each cake of wax without extra cost, thereby acting as an incentive to more extensive use of the wax. Although made of very cheap material the device is nevertheless sufficiently durable to shave the entire cake with which it is supplied. The cake need be wrapped for sale in no special manner, and when being shaved can be exposed, on the end only, keeping the wax clean and free from dust.

The cup can be used either side up, on account of having the edges of the slits 7 bent in opposite directions. This enables it to be used upside down for shaving various substances, by either rotating or reciprocating it on a cake or body of the substance to be shaved. In this case the shavings accumulate in the cup and can be discharged when the cup is full, thereby measuring the shaved substance.

What I claim is:

1. A device for shaving or shredding wax and other substances, comprising a cylindrical cup of sheet metal arranged to fit loosely over a cylindrical cake and having a flange of such length as to have a substantial support thereon, and provided on its head with openings having one edge bent inwardly to form cutters, a threaded rod secured to said cup, and a follower engaged by said rod and arranged to bear against the opposite end of the cake.

2. A device for shaving or shredding wax or other substances comprising a cup of sheet metal arranged to fit over a cake of the substance and having a fluted exterior of such length as to have long bearing there, upon and being provided on its flat face with apertures having cutting edges adjacent thereto, a follower arranged to engage with a cylindrical cake of material and rotate therewith, and a screw threaded rod fixed for rotation with the cup and arranged to engage a screw threaded aperture in the follower for feeding the latter toward the cup.

3. A device for shaving or shredding wax or other substances, comprising a cup formed of sheet metal of considerable depth and provided with a flat head having slits, the metal adjacent to each slit being bent inwardly and outwardly on opposite sides of the slit to form inner and outer cutters, said cup being adapted to serve as a measure for substances shaved or shredded thereby.

4. A device for shaving or shredding wax and other substances, comprising a cylindrical cup of sheet metal arranged to fit loosely over a cylindrical cake and having a flat head and a flange of such length as to have substantial support thereon, and provided on its flat head with openings having one edge bent inwardly and one edge bent outwardly to form inner and outer cutters, a threaded rod secured to said cup, and a follower engaged by said rod and arranged to bear against the opposite end of the cake.

5. A device for shaving or shredding wax or other substances, comprising a cup formed of sheet metal having a flat head and a flange of considerable depth, said flat head being formed with openings therethrough and with cutters on both of its faces adjacent to said openings, either set of said cutters being adapted to shave or shred wax or other material, and the cup being adapted either to be placed over a cake of the material and to be supported thereby with the inner face of the head in contact therewith to shave the same, or to be moved over a cake of the material with the outer face of the head in contact therewith to collect the shaved material in the cup.

In testimony whereof, I have hereunto set my hand.

JAMES F. CRAVEN.

Witnesses:
F. W. WINTER,
MARY E. CAHOON.